United States Patent
Tsai et al.

(10) Patent No.: US 10,051,712 B2
(45) Date of Patent: Aug. 14, 2018

(54) DRIVING MODULE AND LIGHT SOURCE SYSTEM HAVING THE DRIVING MODULE

(71) Applicant: Industrial Technology Research Institute, Hsinchu (TW)

(72) Inventors: Cheng-Yen Tsai, Keelung (TW); Hsuan-Yu Lin, Changhua County (TW); Sue-Chen Liao, Taichung (TW); Pang-Min Shih, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/394,819

(22) Filed: Dec. 30, 2016

(65) Prior Publication Data

US 2018/0160506 A1 Jun. 7, 2018

(30) Foreign Application Priority Data

Dec. 2, 2016 (TW) .............. 105139870 A

(51) Int. Cl.
*H05B 33/08* (2006.01)
*H05B 37/02* (2006.01)
*H05B 37/03* (2006.01)

(52) U.S. Cl.
CPC ......... *H05B 33/0896* (2013.01); *H05B 37/03* (2013.01)

(58) Field of Classification Search
CPC ............... H05B 33/08; H05B 33/0893; H05B 33/0896; H05B 37/02; H05B 37/0272; H05B 37/03
See application file for complete search history.

(56) References Cited

U.S. PATENT DOCUMENTS

| 7,391,335 B2 | 6/2008 | Mubaslat et al. |
| 8,242,787 B2 | 8/2012 | Hente et al. |
| 2006/0061248 A1 | 3/2006 | Cok et al. |

(Continued)

FOREIGN PATENT DOCUMENTS

| CN | 103796373 | 5/2014 |
| TW | I224471 | 11/2004 |

(Continued)

OTHER PUBLICATIONS

"Office Action of Taiwan Counterpart Application," dated May 3, 2017, p. 1-p. 5, in which the listed references were cited.

*Primary Examiner* — Thai Pham
(74) *Attorney, Agent, or Firm* — JCIPRNET

(57) ABSTRACT

A driving module, being electrically connected to a control module and for driving a light emitting device with at least one light emitting element, is provided. The driving module has a driving circuit, which receives a control signal from the control module and transmits a drive current signal and a test current signal to the at least one light emitting element, so as to drive the least one light emitting element. A value of the drive current signal is expressed as If. A value of the test current signal is expressed as It. A relationship between the value of the drive current signal and the value of the test current signal satisfies the following equation (1), (It/If)=0.1%~35% . . . (1), the driving circuit generates a feedback signal based on a status of the least one light emitting element. A light source system having the driving module is provided.

24 Claims, 12 Drawing Sheets

(56) References Cited

U.S. PATENT DOCUMENTS

| | | | | |
|---|---|---|---|---|
| 2011/0089855 A1* | 4/2011 | Roberts | ............... | H05B 33/0893 |
| | | | | 315/291 |
| 2013/0063042 A1* | 3/2013 | Bora | ................ | H05B 33/0863 |
| | | | | 315/292 |
| 2014/0001962 A1* | 1/2014 | Harris | ................ | H05B 33/0842 |
| | | | | 315/153 |
| 2014/0292228 A1* | 10/2014 | Lin | .................... | H05B 33/0851 |
| | | | | 315/307 |
| 2016/0007415 A1 | 1/2016 | Kalkschmidt et al. | | |

FOREIGN PATENT DOCUMENTS

| | | |
|---|---|---|
| TW | 200908809 | 2/2009 |
| TW | I531279 | 4/2016 |

\* cited by examiner

DRIVING MODULE AND LIGHT SOURCE SYSTEM HAVING THE DRIVING MODULE

CROSS-REFERENCE TO RELATED APPLICATION

This application claims the priority benefits of Taiwan application serial no. 105139870, filed on Dec. 2, 2016. The entirety of the above-mentioned patent application is hereby incorporated by reference herein and made a part of this specification.

TECHNICAL FIELD

The technical field relates to driving module and a light source system, and more particularly to a driving module and a light source system capable of performing smart detection of the status of a light emitting element in the light source system and carrying out driving control on the light emitting element.

BACKGROUND

Comparing to general light sources such as incandescent lamps, fluorescent lamps, and the like, since light emitting diode light source (LED light source) and organic light emitting diode light source (OLED light source) are light, mercury-free, ultraviolet radiation free, flexible and used as a planar light source, they are considered as the new light sources with highly-potential perspective.

The light emitting device may include a plurality of OLED light sources. In other words, a plurality of OLED light sources with different properties may be combined to constitute the light emitting device. As shown in Table 1 below, the properties are, for example: rigidity or flexibility, different capabilities, different dimensions or shapes. In consideration of the different properties, in the general technique, for the light emitting device that operates under a particular condition, it is required to use a particular driving module to provide drive current.

TABLE 1

| Characteristic | Capability | Dimension/Shape | Drive current |
|---|---|---|---|
| Rigidity | 55 Lumen/W | 53 × 55 mm² | 40 mA & 60 mA |
| Flexibility | 60 Lumen/W | 100 × 100 mm² | 100 mA & 150 mA & 230 mA |
| | 90 Lumen/W | 140 × 140 mm² | 300 mA & 480 mA |
| | | 200 × 50 mm² | 150~160 mA & 230~245 mA |
| | | 213 × 113 mm² | 570 mA |
| | | 320 × 110 mm² | 500 mA & 800 mA |
| | | 320 × 320 mm² | 1600 mA & 2500 mA |
| | | 406 × 50 mm² | 300 mA & 510 mA |
| | | Round-shape 109 mm² | 150 mA & 230 mA |

Accordingly, in the general light emitting device, some technical problems exist as described below. First of all, when the light emitting device operates differently from one condition to another, it is required to switch to different driving modules accordingly; thus, the cost of driving module cannot be effectively reduced.

Secondly, in the light emitting device, generally different resistors are used to set the protection voltage level for OLED light sources of different dimensions. Therefore, if shorted status occurs, there will be difference in detection of short-circuit voltage of the OLED light sources of different dimensions. In that case, it is difficult to accurately detect which OLED light source is in the shorted status.

Thirdly, in the light emitting device, in the operation condition of constant current, the brightness attenuation curves of different OLED light sources are different from one another. Thus, when one of the OLED light sources is damaged and needs replacement, after the replacement, there is problem of non-uniformity in the brightness of the replaced OLED light source and the rest of original OLED light sources, and the overall light emitting uniformity of the light emitting device is decreased.

SUMMARY

In light of the above, the disclosure provides a driving module and a light source system. The driving module uses a smaller test current signal to identify the status of light emitting elements of different dimensions, and uses a feedback signal to carry out feedback control, thereby performing smart monitoring and control of the light emitting device.

One of the exemplary embodiments includes a driving module for driving a light emitting device, driving module is electrically connected to a control module. The light emitting device includes at least one light emitting element. The driving module includes a driving circuit for receiving a control signal from the control module and transmitting a drive current signal and a test current signal to the at least one light emitting element, so as to drive the at least one light emitting element, wherein $I_f$ represents the value of the drive current signal; $I_t$ represents the value of the test current signal, and the relationship between the value of the drive current signal and the value of the test current signal satisfies an Equation (1) below:

$$(I_t/I_f)=0.1\%\sim35\% \quad (1),$$

the driving circuit generates a feedback signal based on a status of the at least one light emitting element; and the feedback signal is a signal generated by the driving circuit after a determination result is returned to the driving circuit, and the determination result is obtained by flowing the test current signal through the at least one light emitting element, and the feedback signal is returned to the driving module, so that the control module carries out a feedback control to the driving circuit according to the feedback signal.

One of the exemplary embodiments further provides a light source system comprising a light emitting device having at least one light emitting element; a driving module for driving the light emitting device, wherein the driving module includes a driving circuit and a control module, wherein the driving circuit receiving a control signal from the control module, and transmitting a drive current signal and a test current signal to the at least one light emitting element, so as to drive the at least one light emitting element, wherein $I_f$ represents the value of the drive current signal, $I_t$ represents the value of the test current signal, and the relationship between the value of the drive current signal and the value of the test current signal satisfies an Equation (1) below:

$$(I_t/I_f) = 0.1\% \sim 35\% \tag{1}$$

the driving circuit generates a feedback signal based on a status of the at least one light emitting element; and the feedback signal is a signal generated by the driving circuit after a determination result is returned to the driving circuit, and the determination result is obtained by flowing the test current signal through the at least one light emitting element, and the feedback signal is returned to the driving module, so that the control module carries out a feedback control to the driving circuit according to the feedback signal, wherein the driving module uses byte to drive the at least one light emitting element. The byte at least includes two bits, and the byte defines the relationship between the value of the drive current signal and the value of the test current signal in Equation (1).

Based on the above, in the disclosure, the driving module and light source system use the drive current signal combined with the relatively smaller test current signal to identify the value of the voltage of the light emitting element, such that the information of the light emitting element can be detected, and the status (normal operation status, shorted status, or open-circuit status) of the light emitting element can be obtained. Furthermore, the driving circuit generates a feedback signal based on a status of the at least one light emitting element. The feedback signal is a generated by the driving circuit after a determination result is returned to the driving circuit, and the determination result is obtained by flowing the test current signal through the at least one light emitting element. And the feedback signal is returned to the driving module, so that the control module carries out a feedback control to the driving circuit according to the feedback signal, so as to carry out smart control on the light emitting element.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
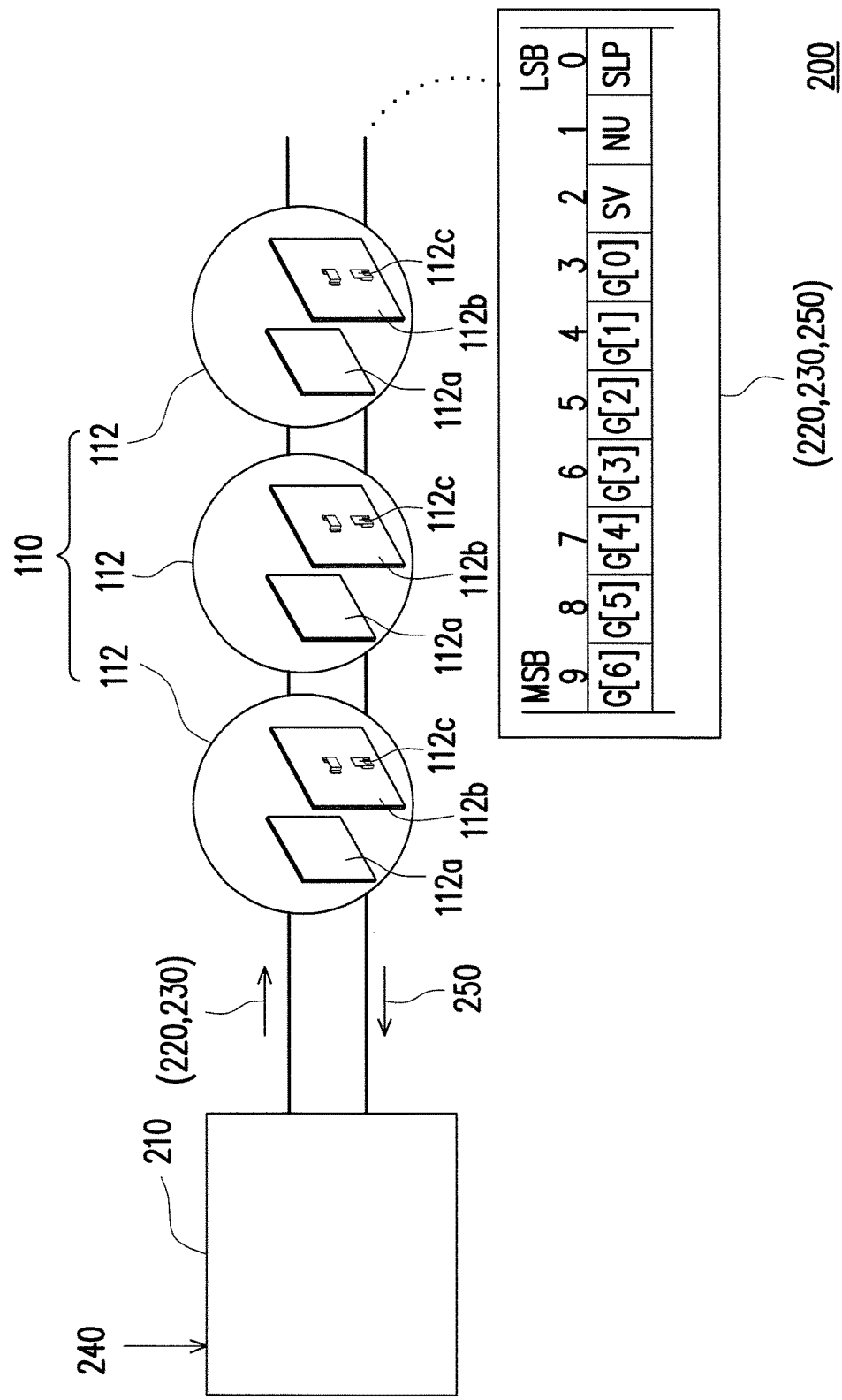
FIG. 1 is a schematic view illustrating a driving module and a light emitting device driven by the driving module according to an embodiment of the disclosure.
Figure 2:
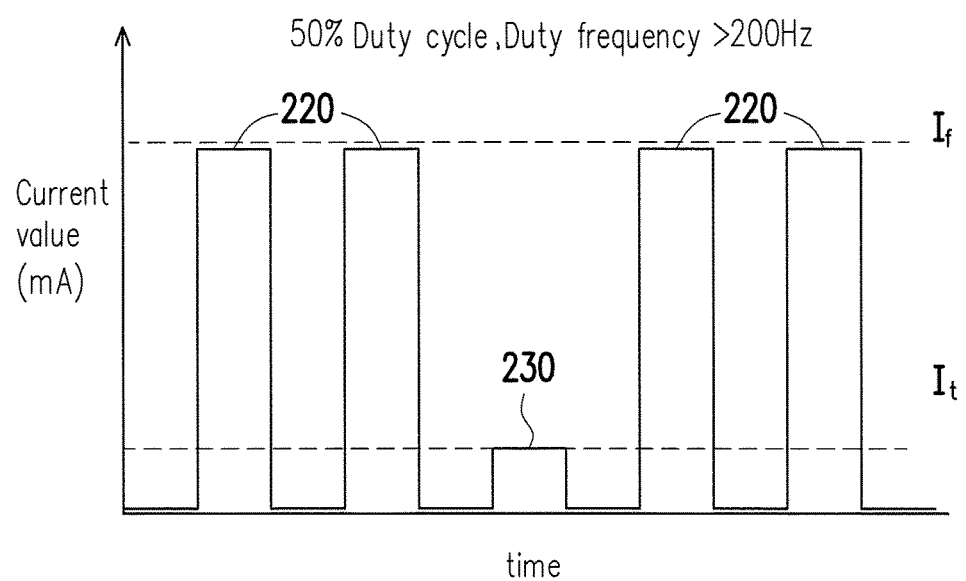
FIG. 2 is a schematic view illustrating a drive current signal and a test current signal according to an embodiment of the disclosure.
Figure 4:
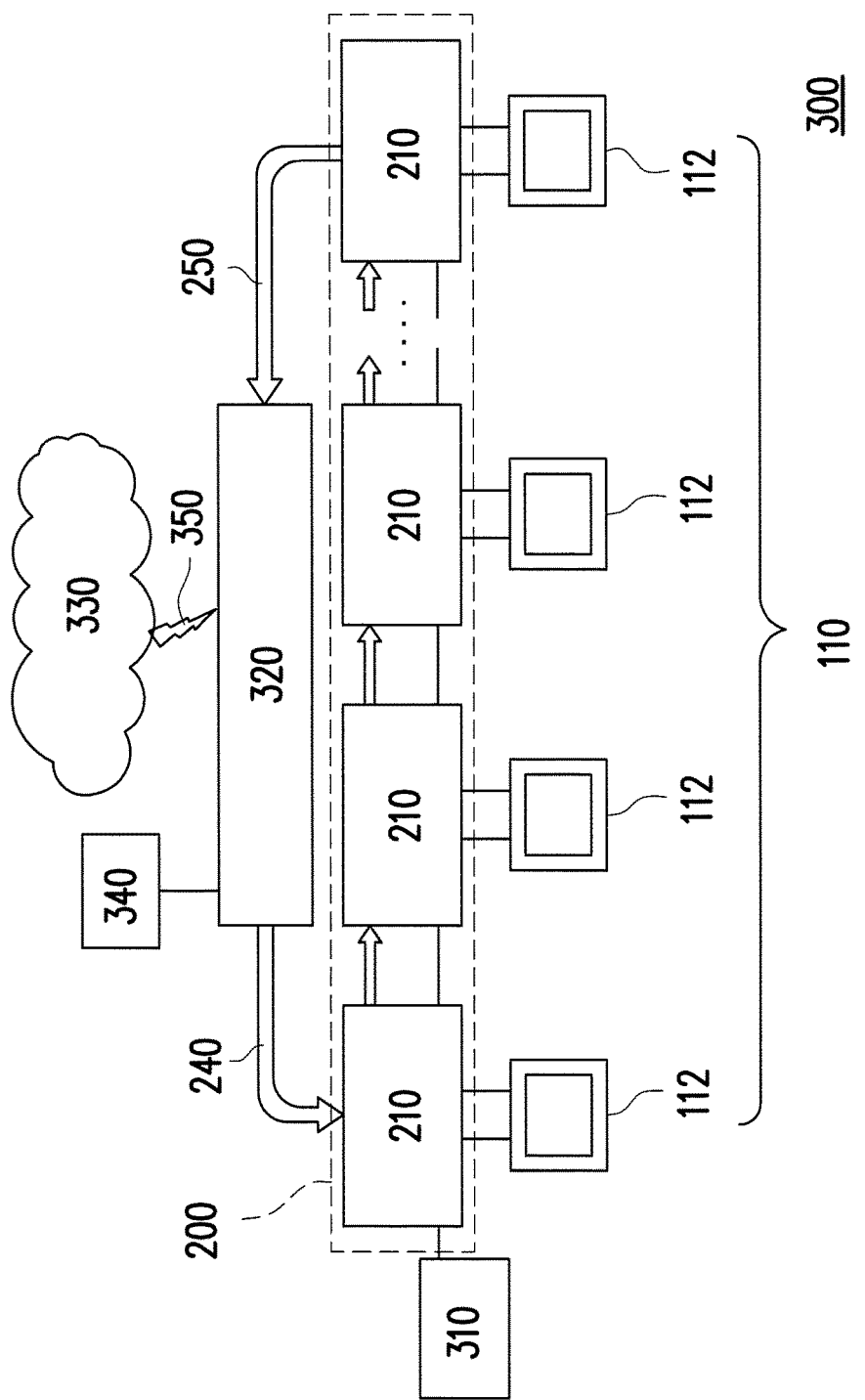
FIG. 4 is a schematic view illustrating a light source system according to an embodiment of the disclosure.

FIG. 1 is a schematic view illustrating a driving module and a light emitting device driven by the driving module according to an embodiment of the disclosure. FIG. 2 is a schematic view illustrating a drive current signal and a test current signal according to an embodiment of the disclosure. Referring to FIGS. 1 and 2, an exemplary embodiment of the disclosure provides a driving module 200 for driving a light emitting device 110. The driving module 200 is electrically connected to a control module 320 (as shown in FIG. 4). The light emitting device 110 may comprise a plurality of light emitting elements 112 electrically connected to each other. Each of the light emitting elements 112 may include an organic light emitting diode light source (OLED light source) 112a, a driving circuit board 112b and a chip 112c. However, the driving module 200 of the disclosure is not limited to be used for the plurality of light emitting elements. In other words, the driving module 200 of the disclosure may drive a single light emitting element 112 or a plurality of light emitting elements 112. A single light emitting element 112 may also adopt the driving method of the driving module 200 in the embodiment of the disclosure to detect fail status. In the case of a plurality of light emitting elements 112, the advantage of the driving module 200 of the disclosure is that the driving module 200 can drive light emitting elements 112 having different drive current. Moreover, the objective of fail detection can be achieved by providing identical test current signal. Descriptions about driving a plurality of light emitting elements 112 are provided in the exemplary embodiment below, which should not be construed as a limitation to the disclosure.

Referring to FIG. 1, the driving module 200 includes a driving circuit 210 for receiving a control signal 240 from the control module 320 and transmitting a drive current signal 220 and a test current signal 230 to a plurality of light emitting elements 112, so as to drive the at least one light emitting element. As shown in FIG. 2, $I_f$ denotes a value of the drive current signal 220; $I_t$ denotes a value of the test current signal 230, and a relationship between the value of the drive current signal 220 and the value of the test current signal 230 satisfies an Equation (1) below:

$$(I_t/I_f)=0.1\%\sim35\% \tag{1}$$

As shown in FIG. 1, the driving circuit 210 generates a feedback signal 250 based on a status of the at least one light emitting elements 112. The feedback signal 250 can signify the status of the at least one light emitting elements 112. The feedback signal 250 is a signal generated by the driving circuit 210 after a determination result is returned to the driving circuit 210, and the determination result is obtained by flowing the test current signal 230 through the at least one light emitting element 112. Moreover, the feedback signal 250 is returned to the driving module 210, so that the control module 320 carries out a feedback control to the driving circuit 210 according to feedback signal 250. The drive current signal 220, test current signal 230 and feedback signal 250 transmitted among the plurality of light emitting elements 112 can be a serial signal as shown in FIG. 1.

Among the serial signals shown in FIG. 1, MSB represents the most significant bit; LSB represents the least significant bit; G[0]~G[6] represent global brightness control bit; SV represents light emitting element short detection level select bit; NU represents "0" for normal operation; SLP represents sleep select bit. The serial signals in FIG. 1 are incorporated for exemplary purpose only; the disclosure provides no limitation to the implementation of the serial signal.

As shown in FIG. 2, as compared with the value $(I_f)$ of the drive current signal 220, the value $(I_t)$ of test current signal 230 is smaller. The driving circuit 210 can transmit the smaller test current signal 230 to the plurality of light emitting elements 112 to detect the voltage of the plurality of light emitting elements 112, thereby acquiring the status of any one of the plurality of light emitting elements 112.

For example, when one of the plurality of light emitting elements 112 is in shorted status, the test current signal 230 makes the light emitting element 112 in shorted status to generate a voltage in a low ratio range. At this time, by detecting the voltage in the low ratio range, it can be determined that the light emitting element 112 is in shorted status. In the meantime, the feedback signal 250 can be used to return the determination result, (information regarding the light emitting element 112 in shorted status) is returned to the control module 320 (as shown in FIG. 4), so that the control module 320 carries out a feedback control to the driving circuit 210 according to the feedback signal 250.

The following paragraph further describes the status of the signal of the voltage generated by the light emitting element 112 in normal operation status (see FIG. 3A) and shorted status (see FIG. 3B) respectively when the drive current signal 220 and test current signal 230 in FIG. 2 pass through the light emitting element 112.

Figure 3A:
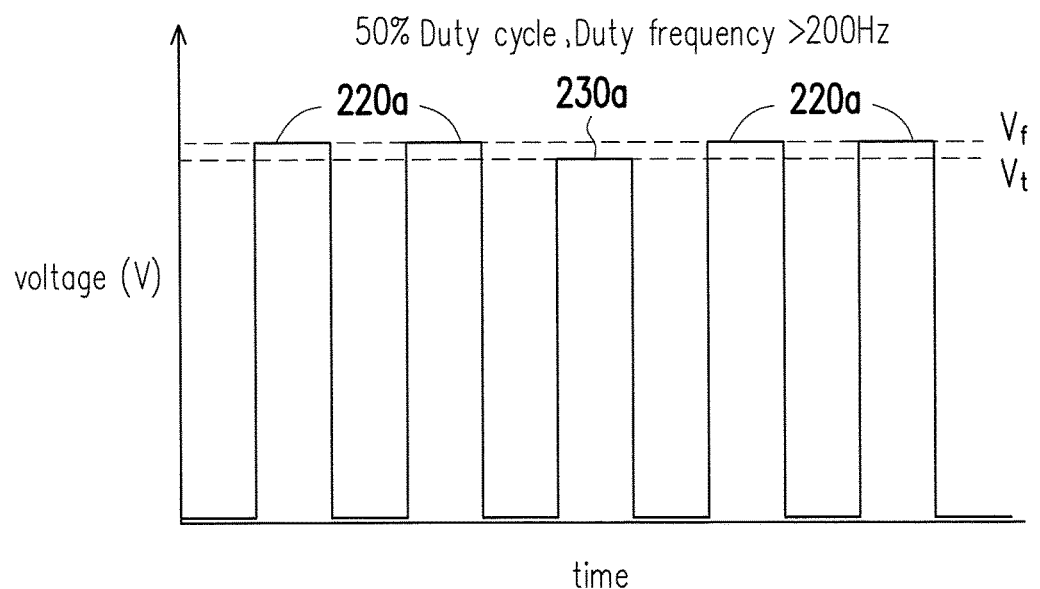
FIG. 3A is a schematic view illustrating a voltage of a light emitting element in normal operation status when employing the drive current signal and test current signal in FIG. 2.

FIG. 3A is a schematic view illustrating a voltage of a light emitting element in normal operation status when employing the drive current signal and test current signal in FIG. 2. Referring to FIGS. 1 and 3A, when the light emitting element 112 is in normal operation status, $V_f$ represents the value of a drive voltage 220a obtained from the drive current signal 220 that passes through the light emitting element 112. $V_t$ represents the value of a test voltage 230a obtained from the test current signal 230 that passes through the light emitting element 112, and a relationship between the value of the drive voltage 220a and the value of the test voltage 230a satisfies the Equation below:

$$(V_t/V_f)=95\%\sim99\%.$$

That is to say, when the smaller test current signal 230 passes through the light emitting element 112, the light emitting element 112 generates the smaller test voltage 230a, and the value $(V_t)$ of the smaller test voltage 230a is about 95%~99% of the value $(V_f)$ of the drive voltage 220a. In other words, when it is observed that the value $(V_t)$ of the test voltage 230a is 95%~99% of the value $(V_f)$ of the drive voltage 220a, it can be determined that the light emitting element 112 is in a normal operation status.

Figure 3B:
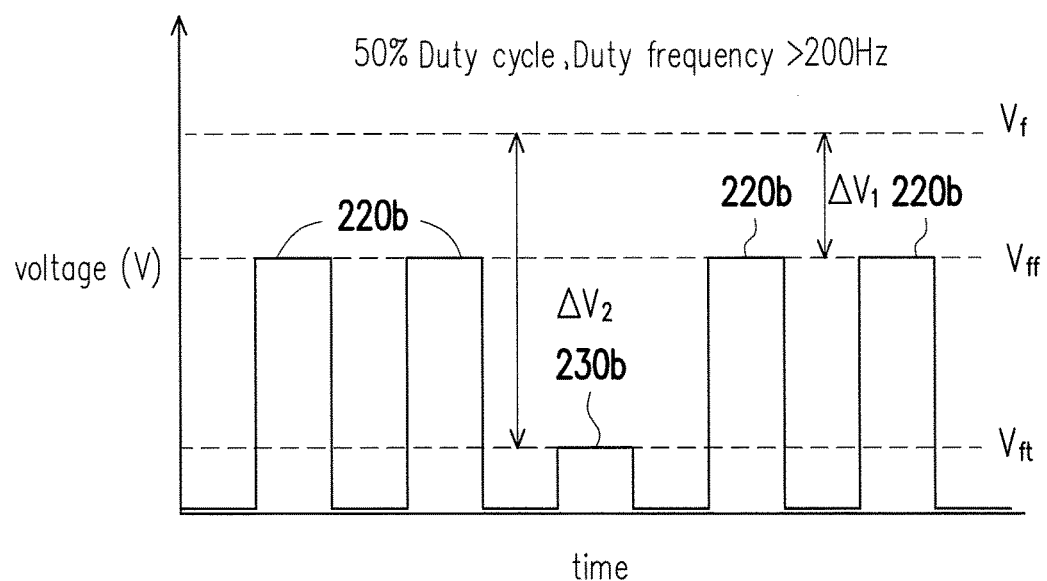
FIG. 3B is a schematic view illustrating a voltage of a light emitting element in shorted status when employing the drive current signal and test current signal in FIG. 2.

FIG. 3B is a schematic view illustrating a voltage of a light emitting element in shorted status when employing the drive current signal and test current signal in FIG. 2. Referring to FIGS. 1 and 3B, $V_f$ represents the value of the drive voltage obtained from the drive current signal 220 that passes through the light emitting element 112 when the light emitting element 112 is in normal operation status. When one of the light emitting element 112 is in shorted status, $V_{ff}$ represents the value of a fail voltage 220b obtained from the drive current signal 220 that passes through the light emitting element 112 in shorted status; $V_{ft}$ represents the value of the test voltage 230b obtained from the test current signal 230 that passes through the light emitting element 112 in shorted status. A relationship between the value $(V_f)$ of the drive voltage and the value $(V_{ff})$ of the fail voltage 220b satisfies an Equation (2) below; a relationship between the value $(V_{ft})$ of the test voltage 230b and the value $(V_f)$ of drive voltage satisfies an Equation (3) below:

$$V_f > V_{ff} \tag{2}$$

$$(V_{ft}/V_f)=0.1\%\sim7\% \tag{3}$$

In other words, when it is observed that the value of test voltage 230b is 0.1%~7% of the value of drive voltage 220a, it can be determined that one of the light emitting elements 112 is in shorted status.

In addition, further referring to FIG. 3B, $V_t$ represents a value of the test voltage 230b obtained from the test current signal 230 that passes through the at least one light emitting element 112 when the at least one light emitting element 112 is in normal operation status. A relationship between the value of the test voltage 230b in shorted status and the value of the test voltage 230b in normal operation status satisfies an Equation (4) below:

$$(V_{ft}/V_t)=0.1\%\sim7\% \tag{4}$$

Based on the above, the driving module 200 in the embodiment of the disclosure uses the drive current signal 220 to work with relatively smaller test current signal 230 to obtain the value of the voltage of light emitting element 112, thereby detecting the information of light emitting element 112 and determining the status (normal operation status or shorted status) of the light emitting element 112. Additionally, as shown in FIG. 1, the driving circuit 210 may generate the feedback signal 250 based on the status of the at least one light emitting element 112. The feedback signal 250 is a signal generated by the driving circuit 210 after a determination result is returned to the driving circuit 210, and the determination result is obtained by flowing the test current signal 230 through the at least one light emitting element 112, and the feedback signal 250 is returned to the control module 320, so that the control module 320 carries out a feedback control to the driving circuit 210 according to the feedback signal 250, thereby carrying out smart control on the light emitting element 112.

Moreover, when the light emitting element 112 is in open-circuit status, the value ($V_f$) of the drive voltage arises and exceeds the initial withstand voltage (e.g. the withstand voltage of the driving circuit 210) of the driving module 200. Therefore, when open-circuit detection is carried out, a current that is equivalent to the drive current signal 220 is output to the at least one light emitting element 112. When the drive voltage ($V_f$) of the at least one light emitting element 112 exceeds the withstand voltage of the driving module 200, it can be determined that the light emitting element 112 is in open-circuit status.

Based on the above, even though the plurality of light emitting elements 112 have different properties (rigidity or flexibility, different capabilities, different dimensions or shapes, etc.), the driving circuit 210 can detect the information of the different light emitting elements 112, and carry out feedback control according to the feedback signal 250. Accordingly, the light emitting element 112 that operates in multiple operation conditions can be driven with the use of only one driving module 200 so that the cost of driving module can be effectively reduced.

Moreover, by using smaller test current signal 230, a larger difference in the test voltage of the light emitting element 112 of different dimensions is generated, such that a better identification rate can be achieved. Accordingly, it can be more accurately detected which the light emitting element 112 is in shorted status.

In an embodiment of the disclosure, the drive current signal 220 and test current signal 230 may be a pulse width modulation signal. The frequency of the pulse width modulation signal is larger than 60 Hz, and the duty cycle of the pulse width modulation signal is 50%~80%, which should not be construed as a limitation to the invention. In the exemplary embodiment shown in FIG. 2, the pulse width modulation signal has a frequency larger than 200 Hz, and the duty cycle thereof is 50%.

FIG. 4 is a schematic view illustrating a light source system according to an embodiment of the disclosure. Referring to FIGS. 1, 2 and 4, a light source system 300 may include a light emitting device 110 and the driving module 200 shown in FIG. 1. The light emitting device comprises at least one light emitting element 112. The driving module 200 is used for driving the light emitting device 110.

The driving module 200 includes the driving circuit 210 and the control module 320, wherein the driving circuit 210 receiving a control signal from the control module 320 and transmitting the drive current signal 220 and test current signal 230 to the light emitting element 112, wherein $I_f$ represents the value of the drive current signal 220, $I_t$ represents the value of the test current signal 230, and a relationship between the value ($I_f$) of the drive current signal 220 and the value ($I_t$) of the test current signal 230 satisfies the Equation (1) below:

$$(I_t/I_f) = 0.1\% \sim 35\% \qquad (1).$$

As shown in FIG. 1, the driving circuit 210 generates the feedback signal 250 based on a status of the at least one light emitting element 112. The feedback signal 250 is a signal generated by the driving circuit 210 after a determination result is returned to the driving circuit 210, and the determination result is obtained by flowing the test current signal 230 through the at least one light emitting element 112, and the feedback signal 250 is returned to the control module 320, so that the control module 320 carries out a feedback control to the driving circuit 210 according to the feedback signal 250.

Referring to FIG. 4, the light source system 300 may further include a power supply module 310 which supplies power to the light emitting device 110 and the driving module 200. The power supply module 310 may be general commercial AC power source or other suitable power source for supplying power to the entire light source system 300.

Referring to FIG. 4, a control module 320 of the light source system 300 is electrically connected to the driving module 200. The control module 320 transmits the control signal 240 to the driving module 200 so the driving module 200 drives the light emitting element 112. The driving module 200 generates the feedback signal 250 according to the status of the light emitting element 112 and returns the status of light emitting element 112 to the control module 320.

The control module 320 may be a microcontroller unit (MCU), a personal computer (PC) or a handheld device as the main control center of the entire light source system 300.

Referring to FIG. 4, the light source system 300 may further include a remote module 330 which is connected to the control module 320 via a network 350. The remote module 330 may carry out control on the control module 320. The remote module 330 may be a remote device or a cloud storage device that carries out connection operation on the control module 320 via the network 350. The feedback signal 250 may be returned to the remote module 330 (cloud storage device) via the control module 320 for record. Moreover, the network 350 may be wireless network.

Referring to FIG. 4, the light source system 300 may further include a sensing module 340 which is connected to the control module 320. The sensing module 340 is used for sensing a moving status of an object or temperature information, light intensity or color temperature of an environment, and transmitting a sensing signal to the control module 320.

In an exemplary embodiment, the sensing module 340 may be an image sensor, a temperature sensor, an optical sensor or other suitable sensors. When the sensing module 340 detects that the user enters the environment of the light source system 300, the sensing module 340 transmits the sensing signal to the control module 320 so that the driving module 200 drives the light emitting device 110 to emit light. Similarly, when the user leaves the environment of the light source system 300, the sensing module 340 may generate the sensing signal so that the driving module 200 drives the light emitting device 110 to be turned off.

Further referring to FIG. 4, assume that the light emitting device 110, the driving module 200, the power supply module 310, the control module 320 and the sensing module 340 are installed in a household environment. The user may send a control command to the control module 320 via the remote module 330 (e.g. a remote-control device, mobile phone, or personal computer, etc.) to carry out remote control on the light emitting device 110.

All the information (e.g. operation time period, shorted status, open-circuit status, etc.) of the light emitting device 110 may also be returned to the remote module 330 for storage. The user may check the information stored in the remote module 330 to know the status of each light emitting element 112 of the light emitting device 110. Accordingly, the user can easily carry out replacement of the light emitting element 112.

Figure 5:
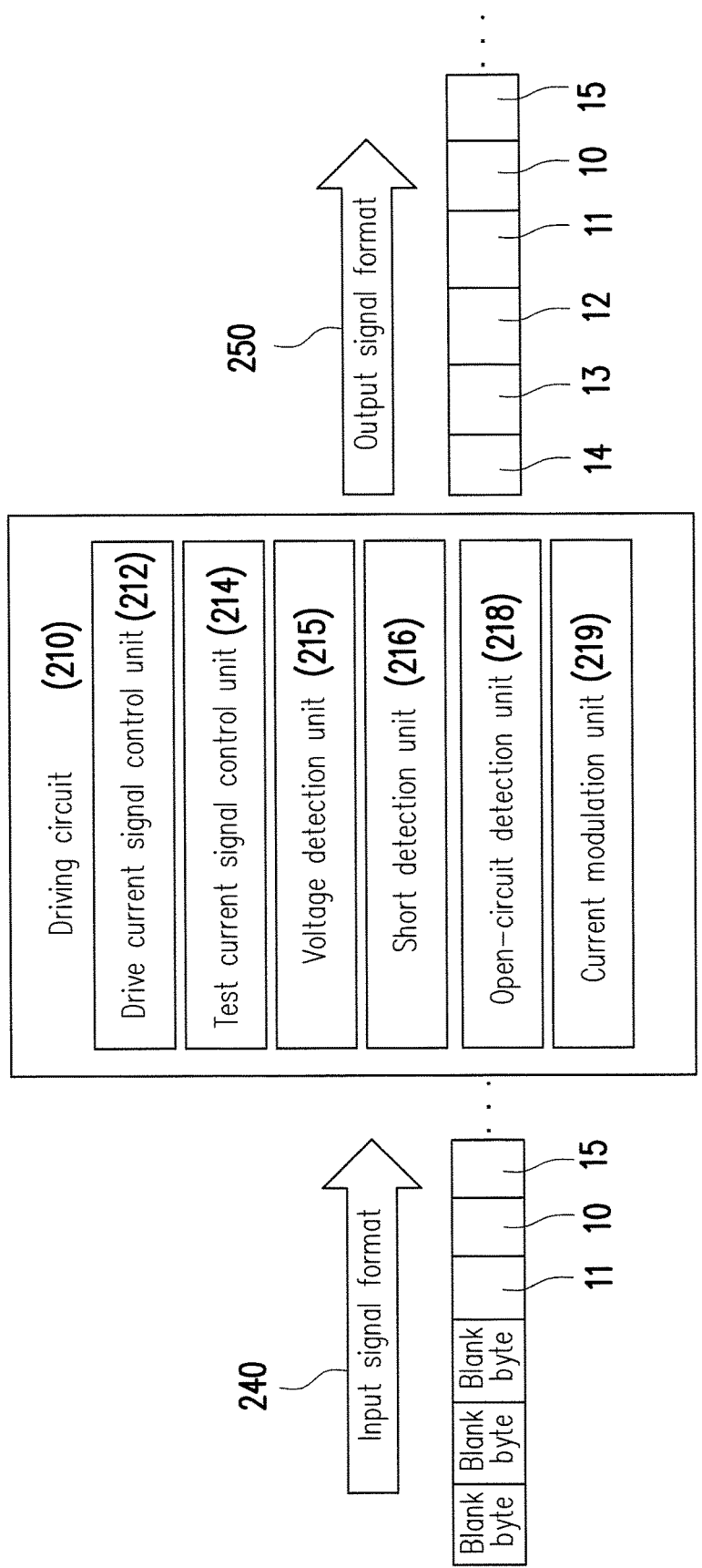
FIG. 5 is a block view illustrating a driving circuit according to an embodiment of the disclosure.

FIG. 5 is a block view illustrating a driving circuit according to an embodiment of the disclosure. Referring to FIG. 5, the driving circuit 210 of the driving module 200 may include a drive current signal control unit 212 which transmits the drive current signal 220; a test current signal control unit 214 which transmits the test current signal 230; a short detection unit 216 which detects the shorted status of the light emitting element 112 according the voltage value of the at least one light emitting element; and a current modulation unit 219 which adjusts and controls the current of the light emitting element 112.

Referring to FIG. 5, the driving circuit 210 may further include at least one of a voltage detection unit 215 and an open-circuit detection unit 218. That is, the driving circuit 210 may include the voltage detection unit 215 and the open-circuit detection unit 218 at the same time, or only include the voltage detection unit 215, or only include the open-circuit detection unit 218. The voltage detection unit 215 uses the serial signal provided by the control module 320 to carry out detection on the at least one light emitting element 112. The open-circuit detection unit 218 uses the serial signal provided by the control module 320 to carry out detection on the at least one light emitting element 112.

FIG. 5 illustrates all of the drive current signal control unit 212, the test current signal control unit 214, the voltage detection unit 215, the short detection unit 216, the open-circuit detection unit 218 and the current modulation unit 219. However, the above-mentioned elements may be combined depending on actual circumstances.

Referring to FIG. 5, the drive current signal control unit 212 can carry out basic output and control of constant current. The test current signal control unit 214 can transmit small test current signal 230 (see FIG. 2).

In an exemplary embodiment, the short detection unit 216 may carry out detection on the shorted status of the light emitting element 112 according to a serial signal provided by the control module 320. The control module 320 provides a serial signal to the current modulation unit 219, so as to control the drive current of the light emitting element 112.

Referring to FIG. 4, after the control signal 240 from the control module 320 enters the driving circuit 210, the driving circuit 210 can return the status (e.g. shorted status, open-circuit status, etc.) of the light emitting element 112 to output the feedback signal 250. As shown in FIG. 5, the control signal 240 may be the serial signal. The input signal format of the control signal 240 may include a plurality of blank byte (FIG. 5 shows three blank byte), a short voltage control byte 11, a constant current control byte 10 and a control current switch byte 15.

Specifically, in the light source system 300, the driving module 200 uses byte to drive the at least one light emitting element 112. The byte at least includes two bits. The byte may be used to define the relationship between the value of the drive current signal 220 and the value of test current signal 230 in Equation (1). The "byte" may also include "a plurality of bits". The "plurality of bits" are used for setting to drive the light emitting element 112, thereby showing the relationship defined in Equations (1)~(4) above. For example, the short voltage control byte 11 defines the voltage value in shorted status. The short voltage control byte 11 may include a plurality of bits such as 10 bits. Moreover, the number of bits can be appropriately selected. The value of voltage in the shorted status can be defined by using the combination of a plurality of bits, namely the relationship defined in Equation (3): $(V_{ft}/V_{f})=0.1\%\sim7\%$.

Figure 6:
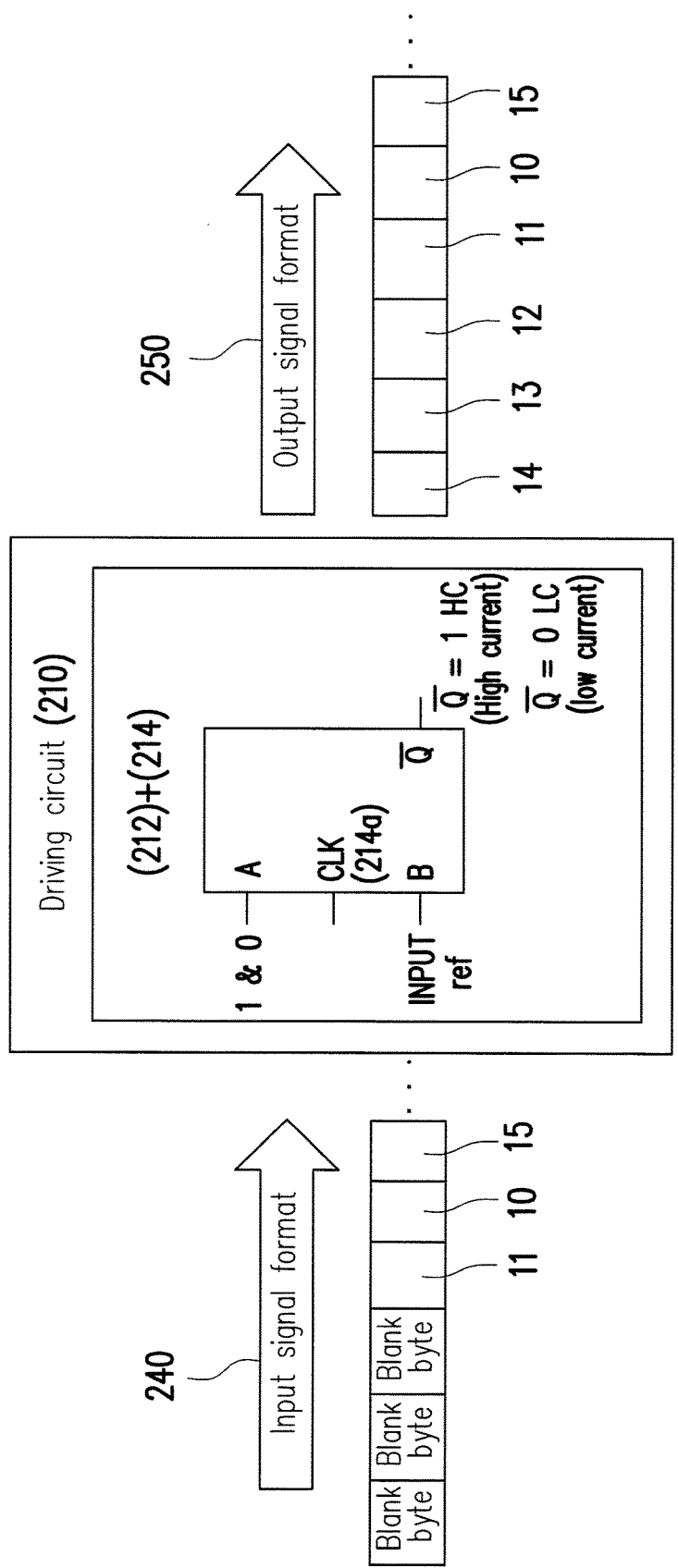
FIG. 6 is a block view illustrating that, in a driving circuit according to an embodiment of the disclosure, a drive current signal control unit and a test current signal control unit are used to carry out digital control on the drive current signal and test current signal.
Figure 8:
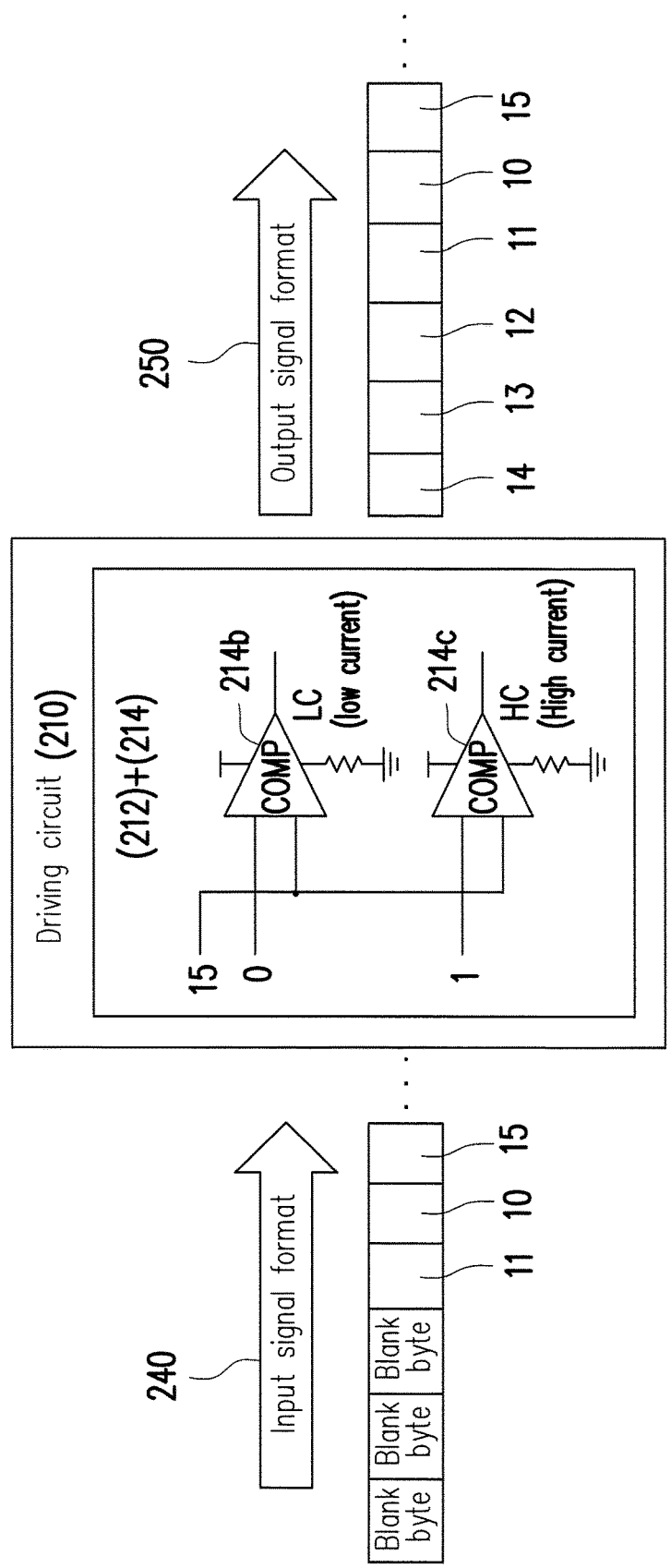
FIG. 8 is a block view illustrating that, in a driving circuit according to another embodiment of the disclosure, a drive current signal control unit and a test current signal control unit are used to carry out analog control on the drive current signal and test current signal.

The constant current control byte 10 and control current switch byte 15 may cooperate with each other. As shown in FIGS. 6 and 8, the control current switch byte 15 can be used to control when to input high current and when to input low current.

When the control signal 240 enters the driving circuit 210 to carry out operation, the driving circuit 210 outputs the feedback signal 250. The output signal format of the feedback signal 250 may include a voltage detection byte 14, an open-circuit detection byte 13, a short detection byte 12, the short voltage control byte 11, the constant current control byte 10 and the control current switch byte 15.

Referring to FIG. 5, the voltage detection unit 215, the short detection unit 216 and the open-circuit detection unit 218 actually carry out determination according to voltage. That is, the voltage detection unit 215 directly outputs a voltage value, and the short detection unit 216 and the open-circuit detection unit 218 determines whether it is the shorted status or open-circuit status according to the voltage value to output "yes" value or "no" value.

Specifically, the voltage detection unit 215 requires a quantitative number (a voltage value) for determination, whereas the short detection unit 216 and the open-circuit detection unit 218 only need to identify whether the voltage value is lower than fail voltage or higher than drive voltage. Therefore, the voltage detection byte 14 is a set of bits output by the driving circuit 210. The set of bits provides detected voltage. Meanwhile, the detection is carried out in the driving circuit 210.

Referring to FIG. 5, the output signal format in the feedback signal 250 also includes the short voltage control byte 11, constant current control byte 10 and control current switch byte 15 for the reason that such design allows the disclosure to drive a plurality of light emitting elements 112.

Specifically, take the short voltage control byte 11 as an example, the serial signal may be set in two ways as described below: (1) all the light emitting elements 112 are the same; moreover, controlled by the same bit, it is all set to read the first bit and second bit of the serial signal; (2) different light emitting elements 112 (e.g. there are five light emitting elements) are included, and the serial signal includes ten bits (2*5=10) in total, wherein the first bit and second bit are read by the first light emitting element 112, the third bit and fourth bit are read by the second light emitting element 112, the fifth bit and sixth bit are read by the third light emitting element 112, the seventh bit and eighth bit are read by the fourth light emitting element 112, the ninth bit and tenth bit are read by the fifth light emitting element 112. Likewise, the constant current control byte 10 and control current switch byte 15 may adopt the same approach as the short voltage control byte 11 above.

In addition, if there is only a single light emitting element 112, the constant current control byte 10, the short voltage control byte 11 and control current switch byte 15 are used to make the system to confirm whether the input bit and output bit are consistent.

Based on the above, as shown in FIG. 5, the driving circuit 210 uses the voltage of the light emitting element 112 as the voltage detection byte 14 to be written into the blank byte and become a part of the feedback signal 250. The driving circuit 210 uses the open-circuit status of the light emitting element 112 as the open-circuit detection byte 13 to be written into the blank byte and become a part of the feedback signal 250. The driving circuit 210 uses the shorted status of the light emitting element 112 as the short detection byte 12 to be written into the blank byte and become a part of the feedback signal 250.

FIG. 6 is a block view illustrating that, in a driving circuit according to an embodiment of the disclosure, the drive current signal control unit 212 and the test current signal control unit 214 are used to carry out digital control on the drive current signal and test current signal. In the exemplary embodiment, the drive current signal control unit 212 may be a digital drive current signal control unit; and the test current signal control unit 214 may be a digital test current signal control unit.

In fact, as shown in FIG. 6, the digital control approach is adopted to show that the driving circuit 210 may output the drive current signal 220 or test current signal 230. The drive current signal control unit 212 can control the drive current value, and the test current signal control unit 214 can control test current value.

As shown in FIG. 6, in a switch A, "1" may be input as a turn-on signal; "0" may be input as a turn-off signal. An input port B receives an input reference signal INPUT ref. An output port $\overline{Q}$ outputs a high current signal HC and a low current signal LC. The switch A can receive the control current switch byte 15 ("1" or "0") in the control signal 240 to determine to turn on (1 is set as to turn on) or turn off output of test current signal.

Referring to FIG. 6, the driving circuit 210 may further comprise a clock generator 214a that provides a clock signal CLK based on which the drive current signal 220 and test current signal 230 are captured. Specifically, the time point that the driving circuit 210 outputs the drive current signal 220 and the test current signal 230 is determined according to the clock signal CLK within the driving circuit 210. For example, the positive edge triggering (i.e. the "rising time" mentioned in following FIGS. 7A and 7B) may be used to be the time point for outputting the drive current signal 220 and the test current signal 230.

Figure 7A:
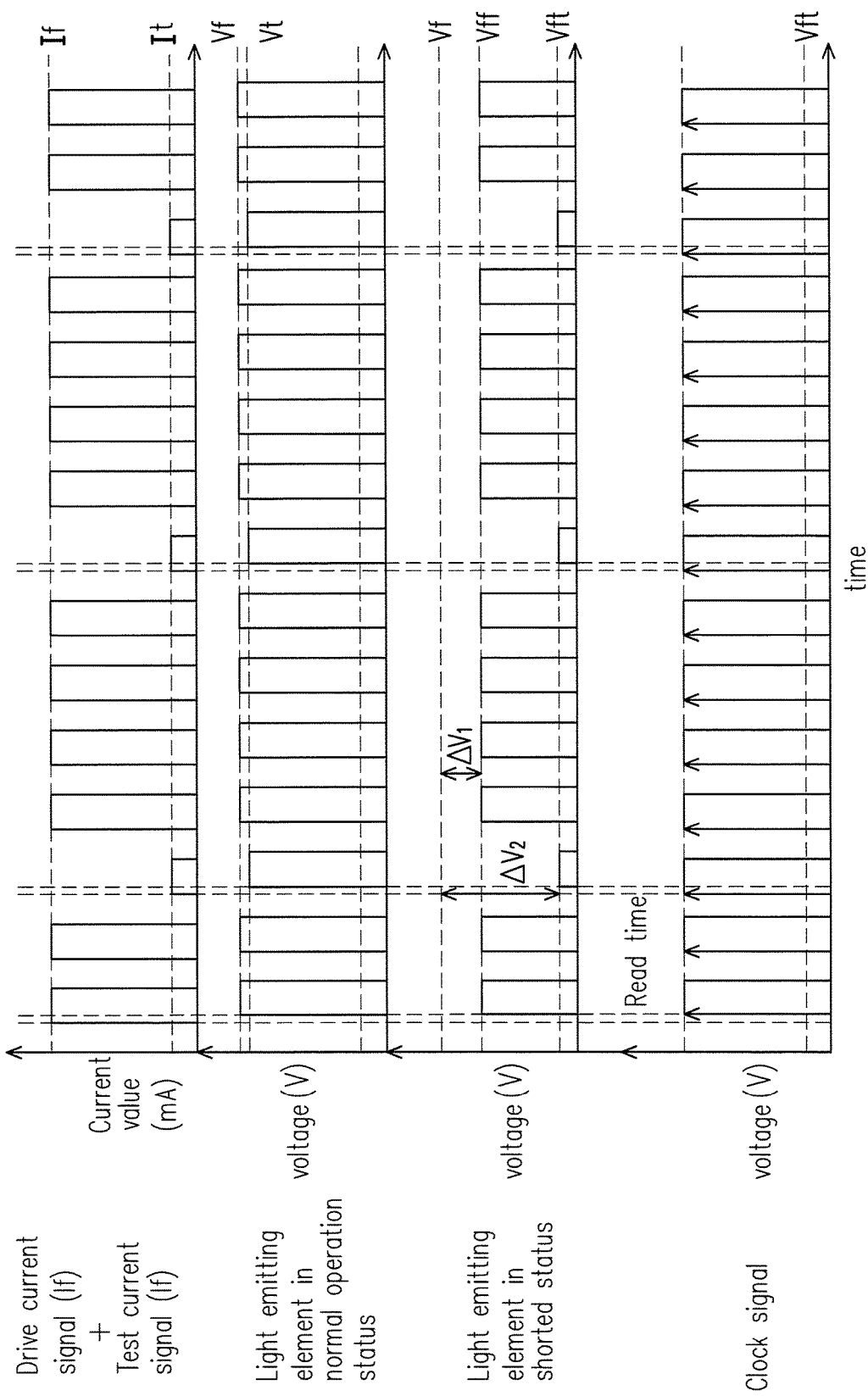
FIG. 7A illustrates a schematic view illustrating comparisons of a current waveform diagram of a drive current signal and a test current signal, a voltage waveform diagram of a light emitting element in normal operation, a voltage waveform diagram of a light emitting element in shorted status and a first clock signal according to an embodiment of the disclosure.

FIG. 7A illustrates a schematic view illustrating comparisons of a current waveform diagram of a drive current signal and a test current signal, a voltage waveform diagram of a light emitting element in normal operation, a voltage waveform diagram of a light emitting element in shorted status and a first clock signal according to an embodiment of the disclosure.

As shown in FIG. 7A, the rising time of the current waveform diagram of the drive current signal 220 and test current signal 230, the voltage waveform of the light emitting element in normal operation, the voltage waveform of light emitting element in shorted status and the clock signal CLK (i.e. the CLK illustrated in FIG. 6) may be calibrated with one another, and a segment of read time is set to read the voltage status of the light emitting element. In other words, the clock signal CLK is used as the basis to determine when the drive current signal 220 and test current signal 230 are captured to generate a corresponding voltage signal. In other words, it can be set when the voltage value is captured by the voltage detection unit 215, the short detection unit 216 and the open-circuit detection unit 218. Accordingly, the small test current signal 230 may be switched along with the clock signal CLK to acquire the information of voltage, shorted status or open-circuit status of each light emitting element.

Figure 7B:
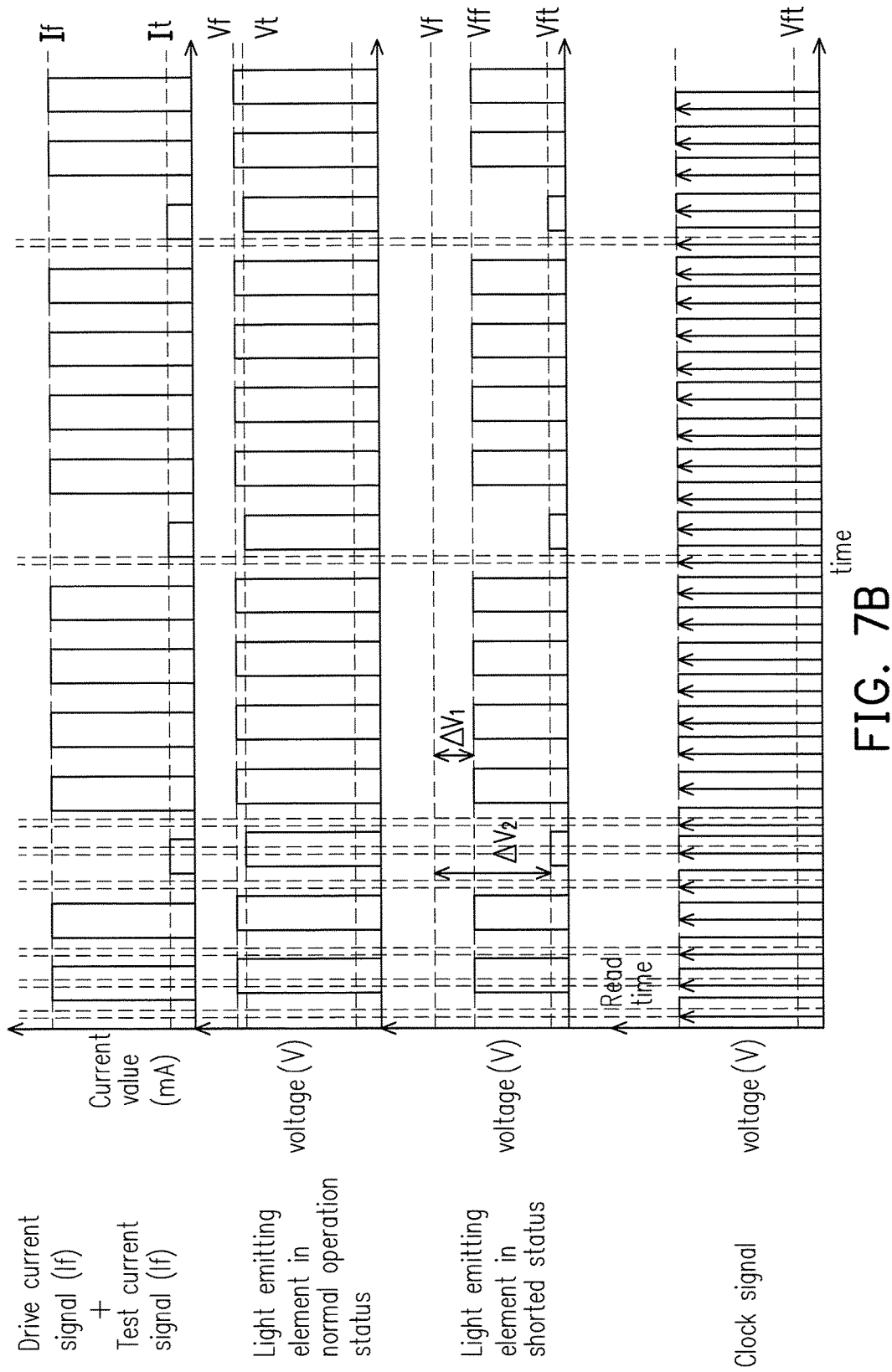
FIG. 7B illustrates a schematic view illustrating comparisons of a current waveform diagram of a drive current signal and a test current signal, a voltage waveform diagram of a light emitting element in normal operation, a voltage waveform diagram of a light emitting element in shorted status and a second clock signal according to an embodiment of the disclosure.

FIG. 7B illustrates a schematic view illustrating comparisons of a current waveform diagram of a drive current signal and a test current signal, a voltage waveform diagram of a light emitting element in normal operation, a voltage waveform diagram of a light emitting element in shorted status and a second clock signal according to an embodiment of the disclosure. It is shown that, in FIG. 7B, the frequency of the second clock signal is double of the frequency of the first clock signal in FIG. 7A. That is to say, since the output current and output voltage may have delay effect, by using the approach of increasing the frequency of the second clock signal, the voltage signal is extracted for a plurality of times within a particular time segment. If the acquired voltage signal is consistent with a shorted signal point or open-circuit signal point, a message is output to indicate that the drive target (e.g. the light emitting element 112) is in shorted status or open-circuit status. Specifically, the frequency of the clock signal CLK may be set within the set time segment to capture the drive current signal 220 and test current signal 230 for a plurality of times.

FIG. 8 is a block view illustrating that, in a driving circuit according to another embodiment of the disclosure, the drive current signal control unit 212 and the test current signal control unit 214 are used to carry out analog control on the drive current signal and test current signal. In the exemplary embodiment, the drive current signal control unit 212 may be an analog drive current signal control unit. The test current signal control unit 214 may be an analog test current signal control unit.

As shown in FIG. 8, the approach of analog control is used to show that the driving circuit 210 can output the drive current signal 220 or test current signal 230, wherein the drive current signal control unit 212 can control the drive current value, and the test current signal control unit 214 can control the test current value.

The driving circuit 210 may include a first comparator 214b and a second comparator 214c. The driving circuit 210 may receive the control current switch byte 15 in control signal 240, "1" used as the turn-on signal, "0" used as the turn-off signal to output the high current signal HC and low current signal LC.

Figure 9:
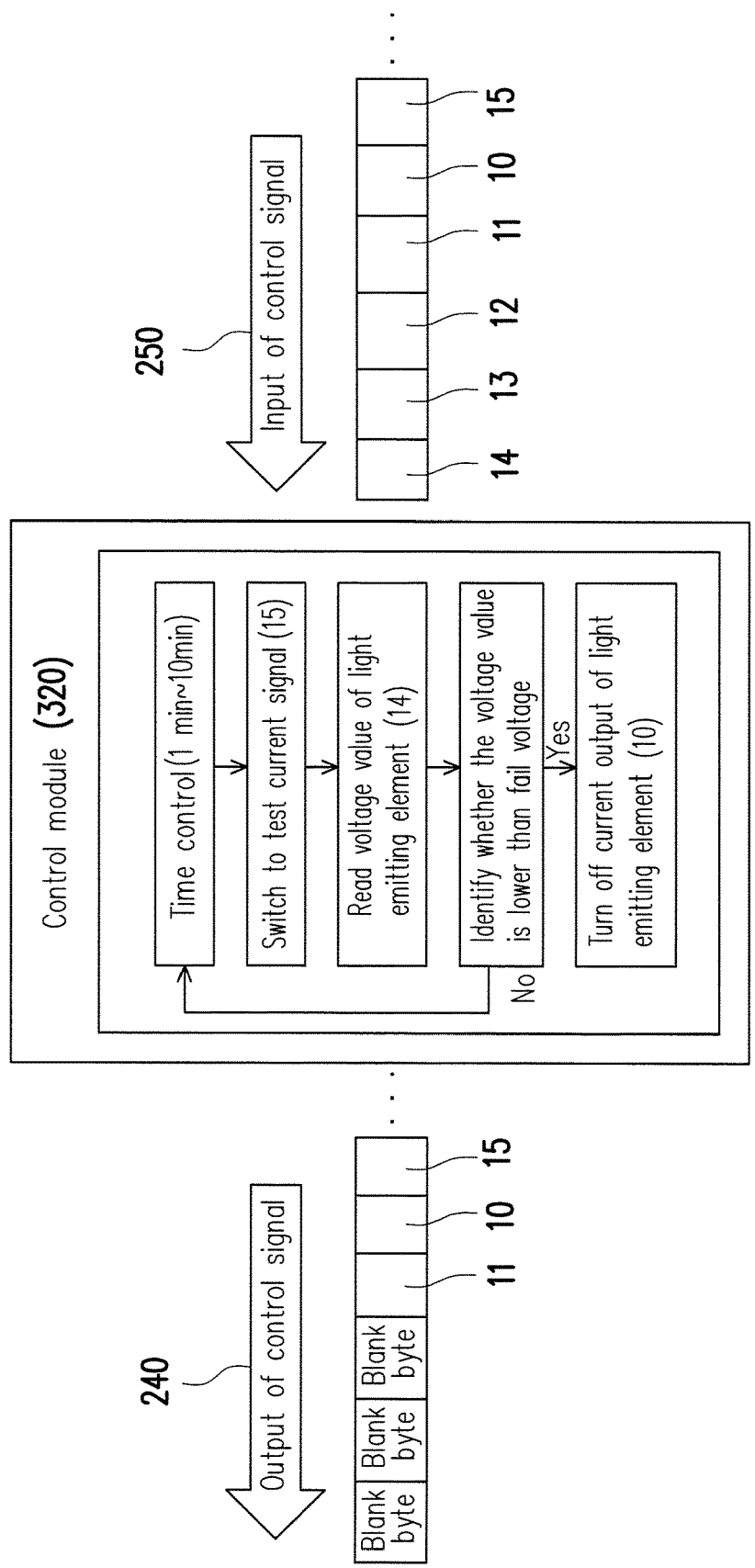
FIG. 9 is a block view illustrating a control module according to an embodiment of the disclosure.

FIG. 9 is a block view illustrating a control module according to an exemplary embodiment of the disclosure. Referring to FIGS. 4 and 9, the control module 320 receives the feedback signal 250 (the input of control signal in FIG. 9). In the meantime, after the fail detection is carried out, the control signal 240 is output (i.e. the output of control signal in FIG. 9). The following passage describes the process where the control module 320 carries out fail detection (shorted status) as well as carries out control on the light emitting element 112 in shorted status.

In the control module 320, first of all, the time for carrying out fail detection is set for time control, for example by setting 1~10 (min) for control. Next, the control current switch byte 15 is used to switch to a status where the test current signal is output. Thereafter, the voltage detection unit 215, the short detection unit 216 and the open-circuit detection unit 218 are used to identify whether the voltage value of the light emitting element 112 is lower than the fail voltage (as described above in FIG. 5), within the numeral range described in FIG. 3B. If the voltage value of the light emitting element 112 is lower than the fail voltage, the constant current control byte 10 is used to turn off current output of the light emitting element 112 (identified to be in shorted status). If the voltage value of the light emitting element 112 is not lower than the fail voltage, return to the step of time control to set the time for fail detection and continue to carry out fail detection.

Based on the above, in the embodiments of the disclosure, the driving module 200 and light source system 300 can simplify the control structure of the driving circuit 210. Meanwhile, the small test current signal 230 can be used to detect the shorted voltage of the light emitting element 112 of different dimensions. Furthermore, it is possible to carry out comprehensive remote control to monitor and record the fail status (shorted status and open-circuit status) and attenuation status of the light emitting element 112, thereby achieving smart monitoring and control of the light emitting device 110.

Figure 10:
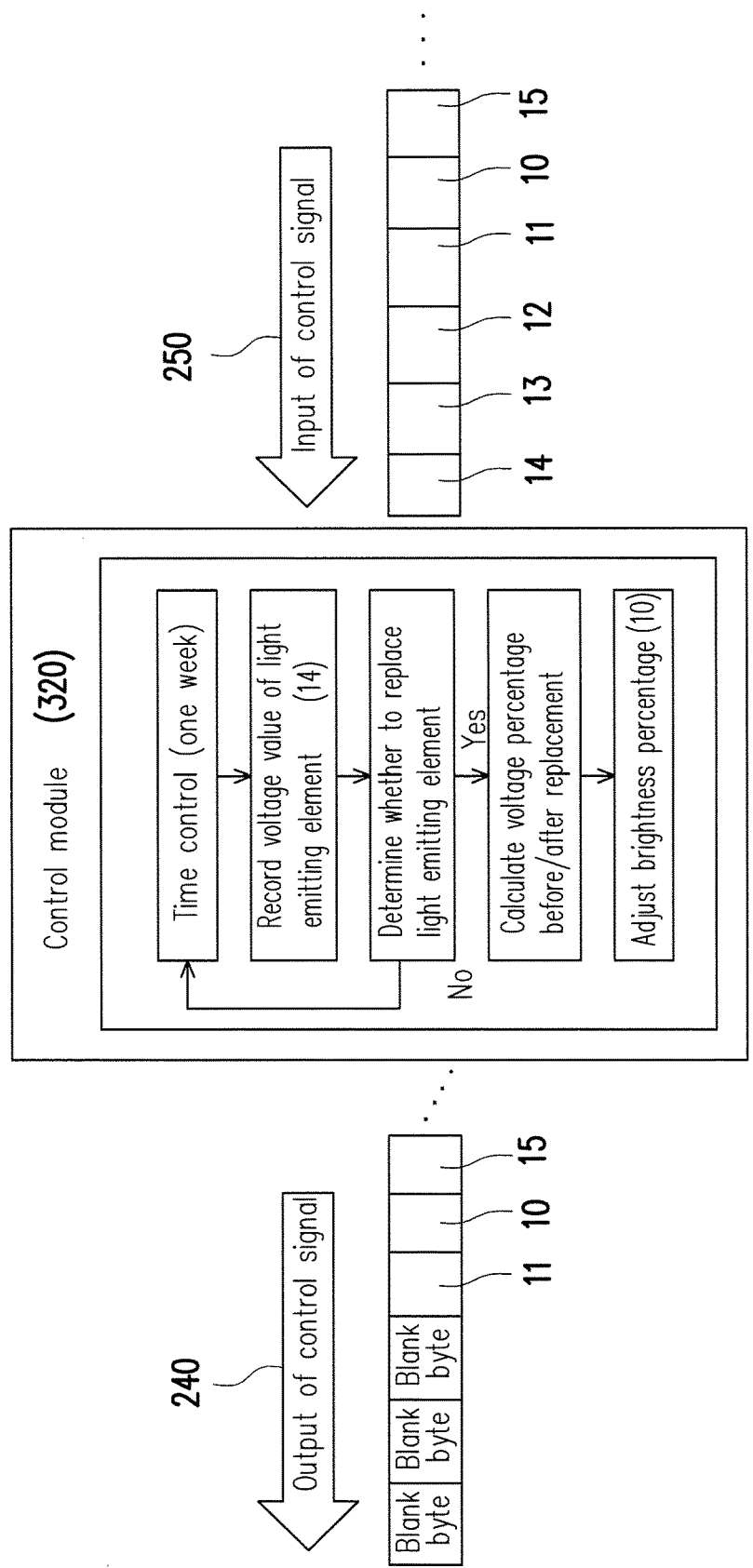
FIG. 10 is a block view illustrating a control module according to another embodiment of the disclosure.

In the passage below, the disclosure provides a solution to the problem of non-uniformity in the brightness of the plurality of original and replaced light emitting elements 112. FIG. 10 is a block view illustrating a control module according to another exemplary embodiment of the disclosure. Referring to FIGS. 4 and 10, the control module 320 receives the feedback signal 250 (i.e. the input of control signal shown in FIG. 10). Moreover, after the brightness uniformity operation is carried out, the control signal 240 is output (i.e. the output of control signal in FIG. 10). The following passage describes the process where the control module 320 carries out brightness uniformity operation.

In the control module 320, first of all, the time for carrying out brightness uniformity operation is set for time control, for example by setting one week (i.e. 7 days) for control. Next, the voltage detection unit 215 is used to detect voltage to output a voltage value so the output voltage value is stored in the memory to record the voltage value of the light emitting element 112. Based on the above, it is shown that the control module 320 can transmit the recorded voltage value of the light emitting element 112 to the remote module 330 (cloud storage device) via the network 350 for storage.

Subsequently, carry out the step of determining whether the light emitting element 112 needs to be replaced. If yes, the voltage percentage before and after replacement is calculated, then the constant current control byte 10 is used to adjust the brightness percentage of the light emitting element 112. If not, return to the step of time control to set the time for brightness uniformity operation and continue to record the voltage value of the light emitting element 112.

Figure 11:
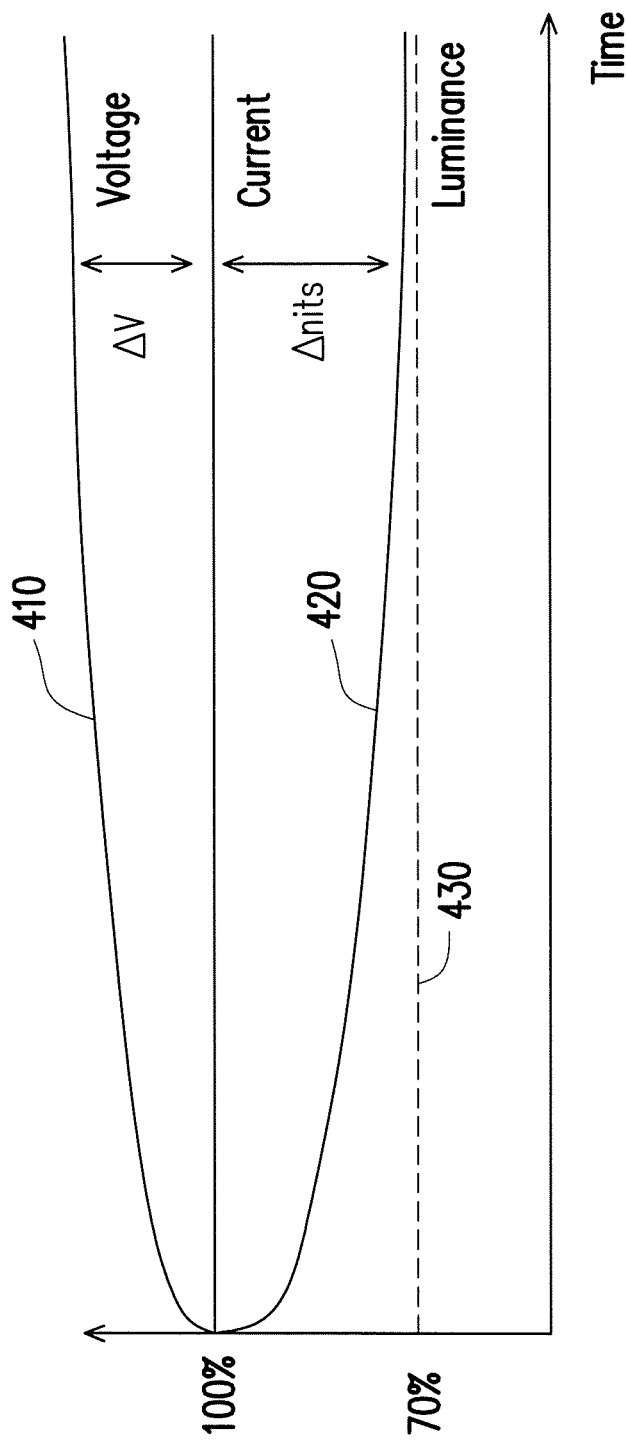
FIG. 11 is a schematic view illustrating a voltage variation curve, a brightness variation curve and an average brightness level line of a light emitting element.

FIG. 11 is a schematic view illustrating a voltage variation curve, brightness variation curve and average brightness level line of the light emitting element. Referring to FIG. 11, since the resistance of light emitting element 112 gradually increases due to aging phenomenon, under the condition of constant current operation (e.g. the fixed current as shown in FIG. 11), a voltage variation curve 410 also ascends gradually. A brightness variation curve 420 gradually descends due to the aging phenomenon of the light emitting element 112. Furthermore, in FIG. 11, an average brightness level line 430 is illustrated; that is, it is set that the average spectrum of brightness of the light emitting device 110 is 70%.

Accordingly, the control module 320 may be used to record the voltage rise percentage (i.e. the voltage variation curve 410 as shown in FIG. 11) of the light emitting element 112 before replacement to estimate the overall brightness attenuation (the brightness variation curve 420 in FIG. 11) of the light emitting device 110. Moreover, the new light emitting element 112 is adjusted to the average spectrum of brightness (i.e. the average brightness level line 430 in FIG. 11) to achieve the effect of uniform brightness; also, the open-circuit detection protection can be carried out simultaneously.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A driving module for driving a light emitting device, the driving module is electrically connected to a control module, the light emitting device comprising at least a light emitting element, the driving module comprising:
a driving circuit, comprises a drive current signal control unit and a test current signal control unit, wherein the driving circuit receiving a control signal from the control module, the drive current signal control unit transmitting a drive current signal and the test current signal control unit transmitting a test current signal to the at least one light emitting element, so as to drive the at least one light emitting element, wherein,
$I_f$ represents a value of the drive current signal, $I_t$ represents a value of the test current signal, and a relationship between the values of the drive current signal and the test current signal satisfies an Equation (1) below:

$$(I_t/I_f)=0.1\%\sim35\% \tag{1}$$

wherein the driving circuit generates a feedback signal based on a status of the at least one light emitting element, the feedback signal is a signal generated by the driving circuit after a determination result is returned to the driving circuit, and the determination result is obtained by flowing the test current signal through the at least one light emitting element, and
the feedback signal is returned to the driving module, so that the control module carries out a feedback control to the driving circuit according to the feedback signal.

2. The driving module according to claim 1, wherein $V_f$ represents a value of a drive voltage obtained via the drive current signal passing through the at least one light emitting element when the at least one light emitting element is in normal operation status,
when the at least one light emitting element is in shorted status, $V_{ff}$ represents a value of a fail voltage obtained via the drive current signal passing through the at least one light emitting element in the shorted status, $V_{ft}$ represents a value of a test voltage obtained via the test current signal passing through the at least one light emitting element in the shorted status, and a relationship between the values of the drive voltage and the fail voltage satisfies an Equation (2) below, a relationship between the values of the test voltage and the drive voltage satisfies an Equation (3) below:

$$V_f > V_{ff} \tag{2}$$

$$(V_{ft}/V_f)=0.1\%\sim7\% \tag{3}$$

3. The driving module according to claim 2, wherein $V_t$ represents a value of a test voltage obtained via the test current signal passing through the at least one light emitting element when the at least one light emitting element is in normal operation status, and a relationship between the value of the test voltage in the shorted status and the value of the test voltage in the normal operation status satisfies an Equation (4) below:

$$(V_{ft}/V_t)=0.1\%\sim7\% \tag{4}$$

4. The driving module according to claim 1, wherein the drive current signal and the test current signal are a pulse width modulation signal,
the pulse width modulation signal having a frequency larger than 60 Hz.

5. The driving module according to claim 1, wherein the driving circuit further comprises:
a short detection unit, detecting a shorted status of the at least one light emitting element according to a voltage value of the at least one light emitting element; and a current modulation unit, adjusting and controlling current of the at least one light emitting element.

6. The driving module according to claim 5, wherein the control module provides a serial signal to the current modulation unit, so as to control a drive current of the at least one light emitting element.

7. The driving module according to claim 5, wherein the short detection unit detects a shorted status of the at least one light emitting element according to a serial signal provided by the control module.

8. The driving module according to claim 5, wherein the drive current signal control unit comprises a digital drive current signal control unit or an analog drive current signal control unit;
the test current signal control unit comprises a digital test current signal control unit or an analog test current signal control unit.

9. The driving module according to claim 5, further comprising a clock generator providing a clock signal, and the drive current signal and the test current signal are captured according to the clock signal.

10. The driving module according to claim 9, wherein a frequency of the clock signal is set within a set time segment to capture the drive current signal and the test current signal for a plurality of times.

11. The driving module according to claim 5, wherein the driving circuit further comprises at least one of a voltage detection unit and an open-circuit detection unit, wherein the voltage detection unit uses a serial signal provided by the control module to detect the at least one light emitting element; the open-circuit detection unit uses the serial signal provided by the control module to detect the at least one light emitting element.

12. A light source system, comprising:
a light emitting device, comprising at least a light emitting element; and
a driving module for driving the light emitting device, the driving module comprising a driving circuit and a control module, wherein the driving circuit comprises a drive current signal control unit and a test current signal control unit, the driving circuit receiving a control signal from the control module, the drive current signal control unit transmitting a drive current signal and the test current signal control unit transmitting a test current signal to the at least one light emitting element, so as to drive the at least one light emitting element, wherein $I_f$ represents a value of the drive current signal, $I_t$ represents a value of the test current signal, and a relationship between the values of the drive current signal and the test current signal satisfies an Equation (1) below:

$$(I_t/I_f)=0.1\%\sim35\% \qquad (1),$$

wherein the driving circuit generates a feedback signal based on a status of the at least one light emitting element, the feedback signal is a signal generated by the driving circuit after a determination result is returned to the driving circuit, and the determination result is obtained by flowing the test current signal through the at least one light emitting element, and
the feedback signal is returned to the driving module, so that the control module carries out a feedback control to the driving circuit according to the feedback signal, wherein the driving module uses a byte to drive the at least one light emitting element, the byte at least comprises two bits, the byte defines a relationship of the values of the drive current signal and the test current signal in the Equation (1).

13. The light source according to claim 12, wherein $V_f$ represents a value of a drive voltage obtained via the drive current signal passing through the at least one light emitting element when the at least one light emitting element is in normal operation status,
when the at least one light emitting element is in a shorted status, $V_{ff}$ represents a value of a fail voltage obtained via the drive current signal passing through the at least one light emitting element in the shorted status, and $V_{ft}$ represents a value of a test voltage obtained via the test current signal passing through the at least one light emitting element in the shorted status, and a relationship between the values of the drive voltage and the fail voltage satisfies an Equation (2) below, a relationship between the values of the test voltage and the drive voltage satisfies an Equation (3) below:

$$V_f > V_{ff} \qquad (2)$$

$$(V_{ft}/V_f)=0.1\%\sim7\% \qquad (3),$$

the byte defines the relationship between the values of the drive voltage and the fail voltage in the Equation (2), and the relationship between the values of the test voltage and the drive voltage in the Equation (3).

14. The light source system according to claim 13, wherein $V_t$ represents a value of a test voltage obtained via the test current signal passing through the at least one light emitting element when the at least one light emitting element is in normal operation status, and a relationship between the value of the test voltage in the shorted status and the value of the test voltage in the normal operation status satisfies an Equation (4) below:

$$(V_{ft}/V_t)=0.1\%\sim7\% \qquad (4),$$

the byte defines the relationship between the value of the test voltage in the shorted status and the value of the test voltage in the normal operation status in the Equation (4).

15. The light source according to claim 12, wherein the driving circuit further comprises:
a short detection unit, detecting a shorted status of the at least one light emitting element according to a voltage value of the at least one light emitting element; and
a current modulation unit, adjusting and controlling a current of the at least one light emitting element.

16. The light source system according to claim 15, wherein the control module provides a serial signal to the current modulation unit, so as to control a drive current of the at least one light emitting element.

17. The light source system according to claim 15, wherein the short detection unit detects a shorted status of the at least one light emitting element according to a serial signal provided by the control module.

18. The light source system according to claim 15, wherein the drive current signal control unit comprises a digital drive current signal control unit, or an analog drive current signal control unit;
the test current signal control unit comprises a digital test current signal control unit, or an analog test current signal control unit.

19. The light source system according to claim 15, wherein the driving module further comprises: a clock generator, providing a clock signal, and the drive current signal and the test current signal are captured according to the clock signal.

20. The light source system according to claim 19, wherein a frequency of the clock signal is set within the set time segment to capture the drive current signal and the test current signal for a plurality of times.

21. The light source system according to claim 15, wherein the driving circuit further comprises: at least one of a voltage detection unit and an open-circuit detection unit, wherein the voltage detection unit uses a serial signal provided by the control module to detect the at least one light emitting element; the open-circuit detection unit uses the serial signal provided by the control module to detect the at least one light emitting element.

22. The light source system according to claim 12, further comprising:
a power supply module, supplying power to the light emitting device and the driving module.

23. The light source system according to claim 12, further comprising:
a remote module, connected to the control module via a network,
the remote module controlling the control module,
the remote module comprising: a remote device or a cloud storage device carrying out connection operation on the control module via the network,
the feedback signal being returned from the control module to the cloud storage device for storage.

24. The light source system according to claim 12, further comprising:
a sensing module, connected to the control module,
the sensing module for sensing a move status of an object or temperature information, light intensity or color temperature of an environment, and transmitting a sensing signal to the control module.

* * * * *